United States Patent [19]

Leighton et al.

[11] Patent Number: 4,519,580

[45] Date of Patent: May 28, 1985

[54] SAFE HIGH PRESSURE INSTRUMENT VALVE

[75] Inventors: Francis Leighton, Woodland Hills; Fred W. Trebes, Northbridge, both of Calif.

[73] Assignee: Air Dry Corporation, Northridge, Calif.

[21] Appl. No.: 610,424

[22] Filed: May 15, 1984

Related U.S. Application Data

[63] Continuation-in-part of Ser. No. 494,657, May 16, 1983, abandoned.

[51] Int. Cl.³ .............................................. F16K 31/44
[52] U.S. Cl. .................................... 251/223; 137/315
[58] Field of Search ............... 251/223, 225, 221, 297, 251/264, 273, 291, 89; 137/15, 243.5, 315

[56] References Cited

U.S. PATENT DOCUMENTS

| | | | |
|---|---|---|---|
| 1,391,012 | 9/1921 | Schulder | 251/291 |
| 1,989,083 | 1/1935 | Dahnken et al. | 251/291 |
| 2,796,881 | 6/1957 | Scheiwer | 137/315 |
| 2,895,495 | 7/1959 | Bryant | 137/315 |
| 3,204,925 | 9/1965 | Montuori | 137/315 |
| 4,204,558 | 5/1980 | Johnson et al. | 137/315 |

FOREIGN PATENT DOCUMENTS 737482  6/1943 Fed. Rep. of Germany ...... 251/264

Primary Examiner—Samuel Scott
Assistant Examiner—Noah P. Kamen
Attorney, Agent, or Firm—Lyon & Lyon

[57] ABSTRACT

A safe high pressure instrument valve comprising a body, a bonnet and stem wherein the stem cannot be inadvertently removed from the bonnet and the bonnet cannot be inadvertently removed from the body. An expanded portion of the stem is removably captured in the bonnet to ensure that the stem remains in the bonnet during operation. A locking means comprising a lock nonrotatably attached to the bonnet, a locking element nonrotatably attached to the body and a means for releasable engaging the lock to the locking element ensures that the bonnet will not be inadvertently removed from the body during operation.

4 Claims, 11 Drawing Figures

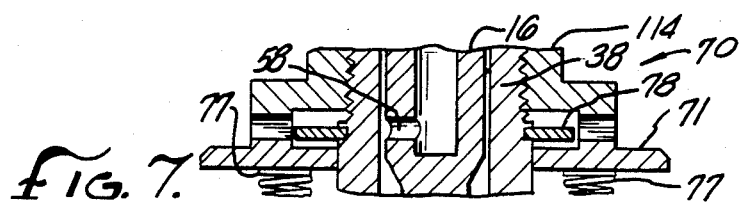
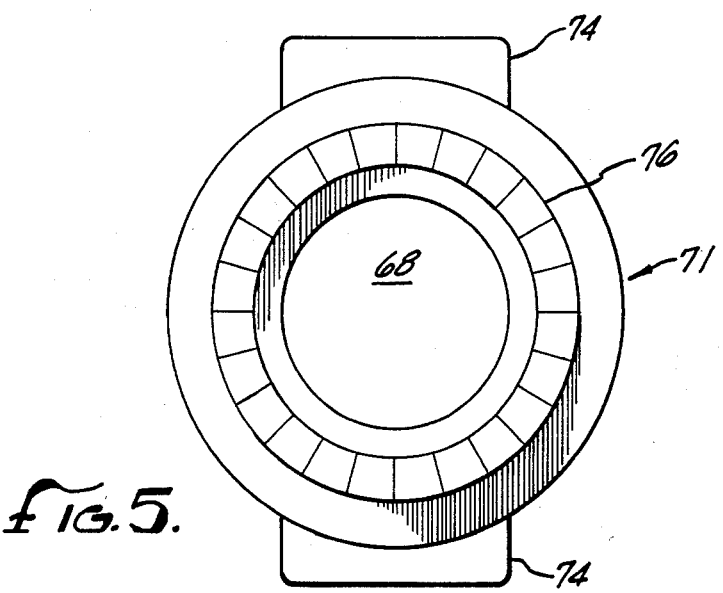
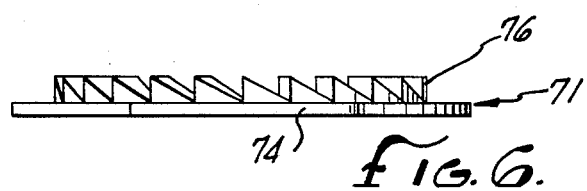
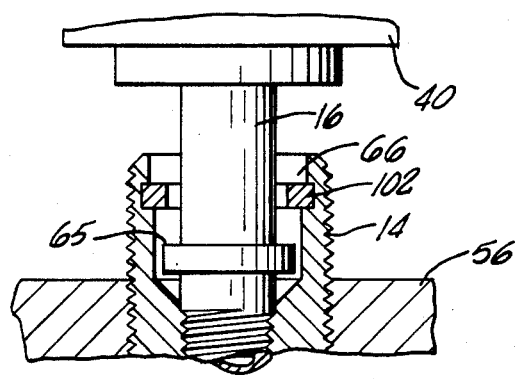
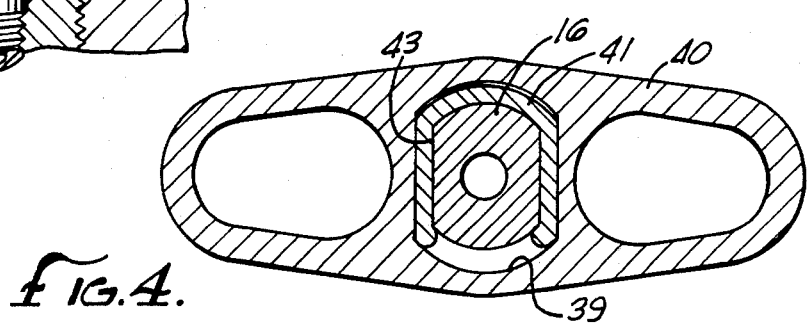

SAFE HIGH PRESSURE INSTRUMENT VALVE

This is a continuation-in-part of application Ser. No. 494,657 filed 5/16/83, now abandoned, which is incorporated herein in its entirety.

BACKGROUND OF THE INVENTION

The present invention is directed to valves, and in particular globe valves.

Globe valves are general purpose valves that have been successfully employed in numerous applications. One such application has been as instrument valves in high pressure fluid lines for fluids such as oil and gas. Because of the nature of the construction of a globe valve, serious accidents have occurred when they were being used as instrument valves in high pressure lines. These accidents have been caused by the inadvertent removal of the stem from the bonnet or the bonnet from the body when opening the valve. Because the pressures maintained in high pressure lines is in the order of 6,000 to 10,000 psi a release of fluid can easily result in injury. In fact, when the fluid is oil, explosions can occur.

To avoid these inadvertent removals of the stem and bonnet, the stems have been swaged to the bonnet and external releasable clamps have been used to secure the bonnet to the body. These measures have not proven completely satisfactory.

The swaging of the bonnet over the stem results in a one piece bonnet and stem assembly. This is not only undesirable from a cost standpoint but the success of this measure depends upon the quality of the swaging which has been known to fail.

The external releasable clamps are not fool proof, as there is no quarantee that the clamps will be reinstalled after disassembly and repair of one of these valves. In operation, a valve that has been reassembled without the safety clamps reinstalled, which has been known to happen, can still result in serious injury.

Although it is possible to design a valve such that the bonnet and the body are of a one piece construction, such a valve would be undesirable in that it would be impossible to replace worn packing or washers or to reseat the valve. Thus, instead of repairing a valve, the entire valve would have to be replaced.

SUMMARY OF THE INVENTION

This invention pertains to valves and in particular globe valves wherein the stem cannot be inadvertently removed from the bonnet and the bonnet is prevented from inadvertent removal from the body through the use of an integral locking means.

The high pressure instrument valve of the present invention is comprised of a body which has an inlet and an outlet connected by a passage, a bonnet removeably attached to the body and a stem rotatable within the bonnet for blocking the passage between the inlet and the outlet.

The stem of a valve of the present invention is prevented from being inadvertently removed by capturing an expanded portion of the stem in an annular region between the bonnet and the body. Thus, the stem can only be removed if the bonnet is first detached from the body. A unique handle assembly is also provided allowing for the removal of the stem from the bonnet.

To prevent inadvertent removal of the bonnet from the body and to ensure that the safety feature will not be accidentally forgotten during repair, a locking means integral with the body and bonnet of the valve is provided. The integral locking means is comprised of lock non-rotatably attached to the bonnet, a locking element non-rotatably attached to the body and a means for releasably engaging the lock and the locking element. Thus, when the lock and locking element are engaged, rotation of the stem cannot remove the bonnet from the body. Furthermore, the fact that the locking means is integral with the valve ensures that the safety feature will not be accidentally omitted.

Accordingly, the present invention provides for a safe high pressure instrument valve.

BRIEF DESCRIPTION OF THE DRAWINGS

FIG. 4 is a sectional view taken along plane 4—4 of FIG. 3.

FIG. 5 is a bottom elevation view of the locking element of the valve of FIG. 1.

FIG. 6 is a side elevation view of the locking element of FIG. 5.

FIG. 7 is a sectional view of a portion of a valve similar to the valve of FIG. 3.

FIG. 11 is a portion of a valve showing an alternative embodiment.

DETAILED DESCRIPTION OF THE DRAWINGS

The present invention is directed to a valve having safety features that prevent unintentional disassembly of the valve. Although the present invention will be described with regard to the globe valve shown in the Figures, which is a valve particularly adapted for high pressure instrument lines, it will be appreciated that the invention is useful for all types of valves used on all types of fluids, including low pressure and high pressure fluids.

Figure 1:
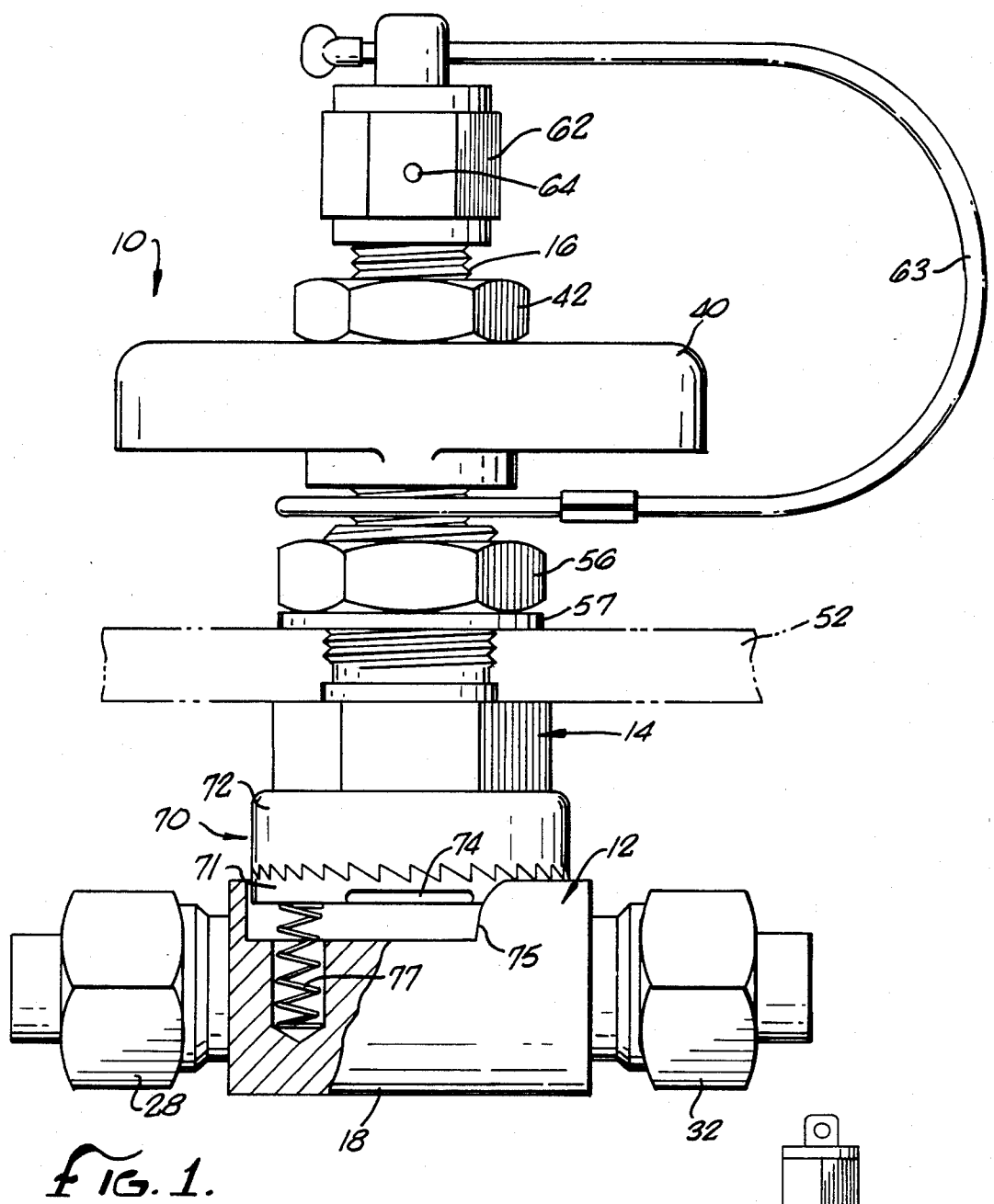
FIG. 1 is a front elevation view of a valve embodying the present invention.
Figure 2:
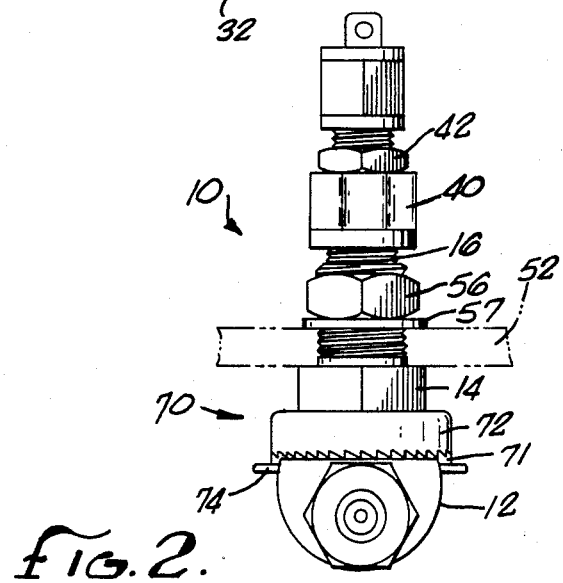
FIG. 2 is an end view of the valve of FIG. 1.
Figure 3:
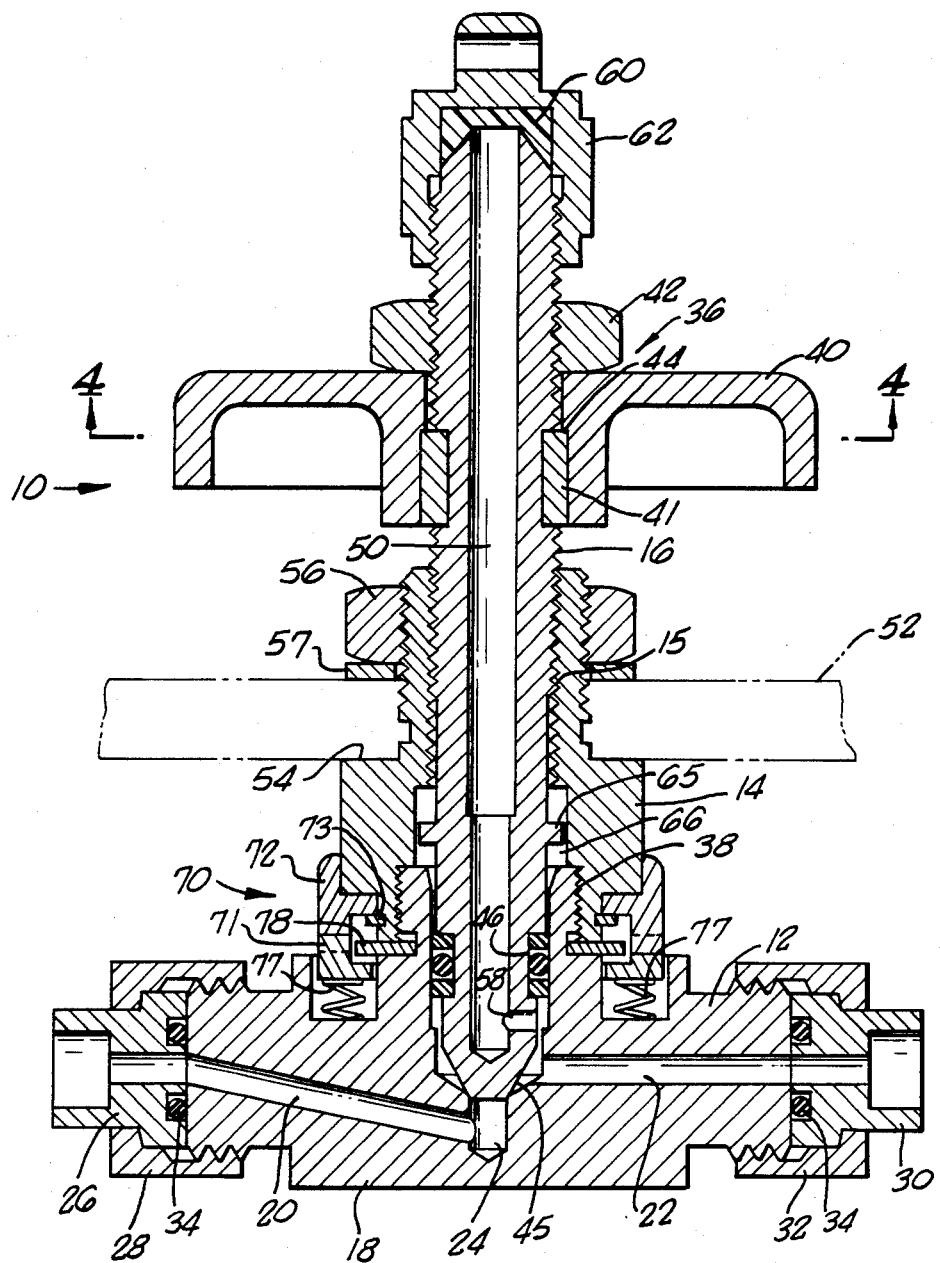
FIG. 3 is a sectional view of the valve of FIG. 1.

With reference to FIGS. 1, 2 and 3, a globe valve 10 comprises as its main components a body 12, a bonnet 14 threaded onto the body 12, and a stem 16 rotatable within the body 12 and the bonnet 14.

The body 12 includes a base portion 18 having an inlet passage 20 and an outlet passage 22 with a connecting passage 24 therebetween. An inlet tail piece 26 is secured to the body 12 at the inlet passage 20 by an inlet nut 28 and an outlet tail piece 30 is secured to the body 12 by an outlet nut 32. Packing 34 is provided in a recess of each tail piece adjacent to the body 12 to prevent fluid leakage.

The body 12 includes an upstanding, exteriorly threaded projection 38 onto which is threaded the bonnet 14. The bonnet 14, generally annular in configuration, has a threaded axial bore 15. The stem 16 has exterior threads which engage the interior threads of the axial bore 15.

A handle assembly 36 attached to the stem 16 is comprised of a handle 40, a clip 41, and a handle nut 42. The clip 41 is U-shaped and slips over two parallel flats 43 machined in the stem 16. The handle 40 has bore 39 which has a step 44 such that the step 44 rests against the top of the clip 36 when the handle 40 is placed over the stem 16. The bore 39 has the same shape as a cross section of clip 41 such that after assembly the clip 41 and the handle 40 cannot rotate with respect to one another. The handle nut 42 is threaded onto the stem 16 securing the handle 40 against the clip 41. Thus, a handle assembly 36 is provided without having to increase the diameter of the stem 16.

Rotating the handle 40, in a clockwise direction (as viewed from above) rotates the stem 16 within the bonnet 14 thereby blocking the connecting section 24 between the inlet passage 20 and the outlet passage 22. In FIG. 3, the valve is shown with the nose 45 of the stem 16 in a seated position blocking the passage. By rotating the stem 16 in a counterclockwise direction (as viewed from above) by means of the handle 40, the stem 16 is partially retracted from the bonnet 14, unblocking the connecting section 24 and opening the valve. Packing is provided in a recess 46 in the stem 16 adjacent to the bore 12 to prevent fluid leakage when the valve is opened.

To prevent the stem 16 from being totally removed from the bonnet 14 an expanded portion 65 is provided on the stem 16. The bonnet 14 has a corresponding enlarged bore 66, such that when the bonnet 14 is threaded onto the projection 38, the expanded portion 65 is captured between the bonnet 14 and the body 12. This arrangement provides a safe positive stop, ensuring that the stem 16 will not be inadvertently removed from the bonnet during operation. Another feature of the arrangement is that although it prevents inadvertent removal of the stem 16 from the bonnet 14, it does allow for removal of the stem 16 for repairs after detaching the bonnet 14 from the body 12. Because the handle assembly 36 does not require an increase of the diameter of the stem 16 for secure engagement, the stem 16 may be completely unthreaded from the bonnet 14 by rotating the stem in a clockwise direction.

Another means for ensuring that the stem 16 cannot be inadvertently removed from the bonnet 14 is shown in FIG. 11. In this arrangement the bonnet 14 has an enlarged bore 66 at its top portion. The expanded portion 65 is held securely in place through means of a snap ring 102.

The valve may be mounted on a panel 52, the underside of which seats against a ledge 54 on the bonnet 14. The valve is mounted onto the panel 52 by a mounting nut 56 and a washer 57. The mounting nut 56 is threaded onto the outside of the bonnet 14.

The stem 16 has a central bore 50 which extends virtually the entire length of the stem 16. Horizontal openings 58 provide fluid communication between the central bore 50 and the outlet passage 22 so that when the valve is opened fluid passes into the central bore 50. The central bore 50 is closed by a nylon seat 60 held in place by a cap nut 62 threaded onto the exterior of the stem 16.

When the valve 10 is used in connection with an instrument, for example a pressure gauge, the gauge can be calibrated using the valve 10 because of the bore 50. This is accomplished by closing the valve, removing the cap nut 62 and the nylon seat 60, and connecting the end of the stem 16 to a source of a known pressure. The known pressure is transmitted through the central bore 50, the horizontal openings 58, the outlet passage 22 to the gauge connected to the outlet tail piece 30. The gauge can then be calibrated such that it registers the known pressure.

As shown in FIG. 1, the cap nut 62 has an opening 64 therethrough so that as the nut 62 is released, any built-up pressure is released. Also, if for some reason the stem is not seated, fluid will continually pass through the opening 64, thereby alerting the operator of the problem before the cap is removed. A wire 63 is provided to ensure that the cap nut 62 is not lost.

To prevent the bonnet 14 from being unthreaded from the body 12 by rotating the stem 16 when it is in its fully retracted position a locking means 70 is employed. The locking means 70 is comprised of a locking element 71, a lock 72, and a means for releasably engaging the locking element 71 from the lock 72. FIGS. 1-3 show the preferred embodiment of the locking means 70 and FIGS. 7-10 show alternative embodiments.

As shown in FIG. 3 the lock 72 is nonrotatably attached to the bonnet 14, and is held on the bonnet 14 by a retaining ring 73.

The locking element 71 is nonrotatably attached to the body 12. The locking element 71, as shown in FIG. 5, is basically annular in shape having a hole in its center large enough to fit over the projection 38 of the body 12. Tabs 74 extend from the periphery of the locking element 71 and are spaced 180° apart. As shown in FIG. 1, when the locking element 71 is in place over the projection 38, the tabs 74 fit into slots 75 in the body 12.

As shown in FIGS. 5 and 6, the locking element 71 has a plurality of teeth 76 that when the valve is assembled engage corresponding teeth 76 of the lock 72. The means for releasably engaging the lock 72 and the locking element 71 comprises a biasing means shown in FIGS. 1 and 3, as compression springs 77. By slidably attaching the locking element 71 to the projection 38, the lock 72 and the locking element 71 are urged towards one another by the compression springs 77 during operation; but may be disengaged through compression of the springs 77 by pressing down on the tabs 74. The locking element 71 is held in place when the bonnet 14 is detached from the body 12 by retaining ring 78.

FIG. 7 shows the locking means 70 wherein the lock 72 is integrally formed with the bonnet 14.

Although the locking means 70 is shown in FIG. 3 with the locking element 71 and the lock 72 having a plurality of teeth any number of teeth would suffice. Indeed other mechanisms than interengaging teeth can be employed. All that is necessary is that when the lock 72 and the locking element are engaged they cannot rotate with respect to each other. For example a single male projection and a corresponding female opening can be employed. Frictional engagement such as can be achieved from use of gall prone material; or a pawl and ratchet system; or a clutch mechanism or mating prongs can all be utilized.

Figure 8:
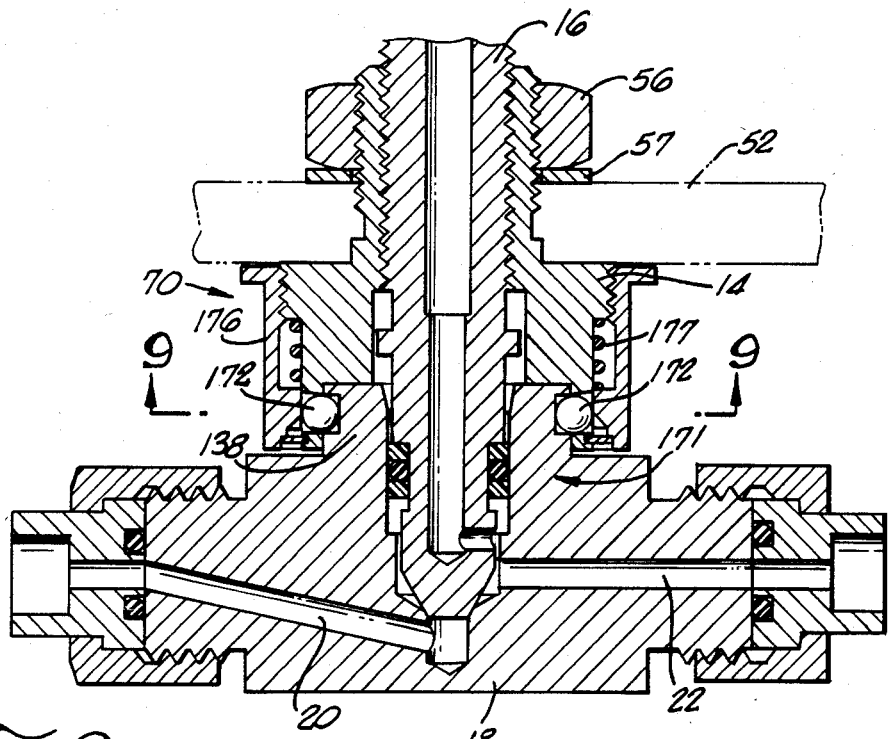
FIG. 8 is a sectional view of a portion of a valve depicting a second embodiment of the locking means.
Figure 9:
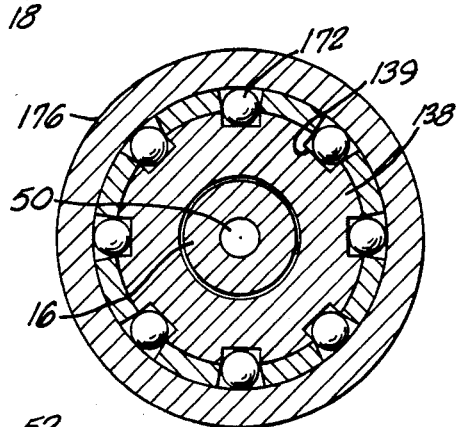
FIG. 9 is a sectional view taken along plane 9—9 of FIG. 8.

A second preferred embodiment of the locking means 70 is depicted in FIG. 8. In this embodiment the locking element 171 is comprised of the projection 138 and a plurality of detents 139 bored into the projection 138. The lock is comprised of a plurality of ball bearings 172 that engage the detents 139 of the locking element. The means for releasably engaging the lock from the locking element comprises a sleeve 176 threadably attached to the bonnet 14 and a compression spring 177. By rotating the sleeve 176 clockwise or counterclockwise the ball bearings 172 are engaged or disengaged from the detents 139.

Figure 10:
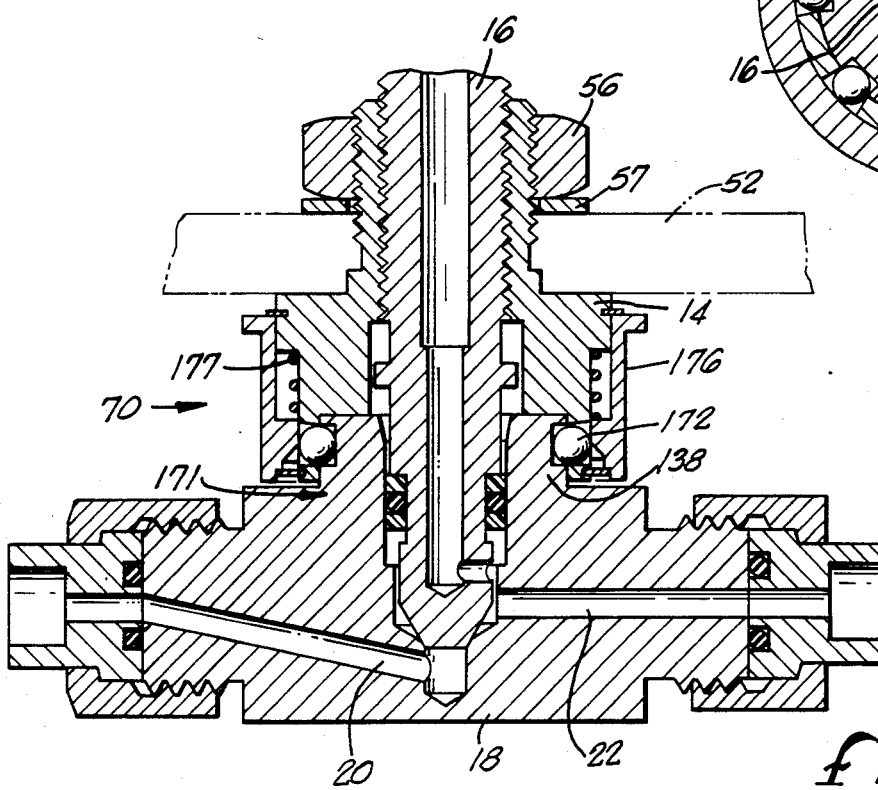
FIG. 10 is a sectional view of a portion of a valve depicting an embodiment of the version of the valve shown in FIG. 8.

FIG. 10 depicts the same type of locking means only with the sleeve 176 telescopically attached to the bonnet rather than threadably attached as shown in FIG. 8. Thus, when the sleeve 176 is in a first position, the ball bearings 172 are engaged with the detents 139; and when the sleeve 176 is in a second position away from the body 12, the ball bearings 172 are disengaged from the detents 139. A biasing means shown as a spring 177 may be used to urge the sleeve 176 in the first position.

While embodiments and applications of this invention have been shown and described, as would be apparent to those skilled in the art many more modifications are possible without departing from the inventive concepts described herein. The invention, therefore is not to be restricted except in the spirit of the appended claims.

What is claimed is:

1. A valve comprising:
    a body having an inlet, an outlet, and a passage between said inlet and said outlet;
    a bonnet threaded onto said body;
    a stem rotatable within said bonnet such that said stem is capable of blocking said passage;
    an integral locking means between said body and said bonnet wherein said locking means comprises a locking element nonrotatably attached to said body such that when said bonnet is detached from said body said locking element remains nonrotatably attached to said body;
    a lock nonrotatably attached to said bonnet, such that when said bonnet is detached from said body said lock remains nonrotatably attached to said bonnet; and
    a means for releasably engaging said lock and said locking element; said lock and said locking element each having at least one interengaging tooth.

2. The valve of claim 1 wherein said locking element has a plurality of teeth and said lock has a plurality of teeth capable of nonrotatable engagement with said locking element teeth.

3. The valve of claim 1 wherein said body comprises a projection and said means for releasably engaging said lock and said locking element includes slideably attaching said locking element to said projection and using a biasing means urging said locking element against said lock.

4. The valve of claim 1 further comprising a handle assembly, said handle assembly comprising a handle, a handle nut and a u-shaped clip, wherein said u-shaped clip is nonrotatably engaged to said stem such that the diameter of said stem is not increased, said handle is nonrotatably attached to said u-shaped clip and said handle nut is threaded onto said stem forcing said handle against said u-shaped clip.

* * * * *